April 5, 1927.

C. A. FRICK ET AL 1,623,946

AUTOMOBILE BODY

Filed Oct. 29, 1923   2 Sheets-Sheet 1

INVENTORS
Chester A. Frick and
Ralph W. Dwight,
BY
Arthur M. Hood.
ATTORNEY

April 5, 1927.
C. A. FRICK ET AL
AUTOMOBILE BODY
Filed Oct. 29, 1923   2 Sheets-Sheet 2
1,623,946
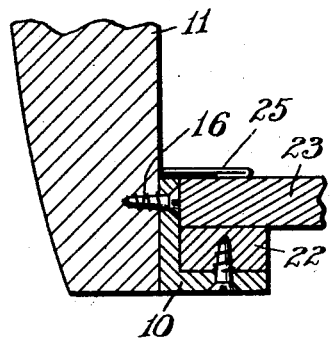
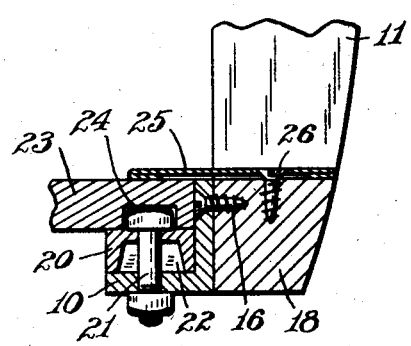
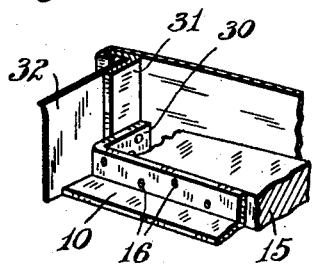
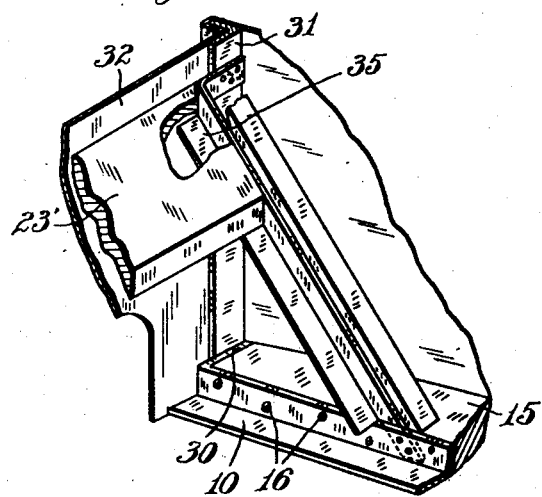
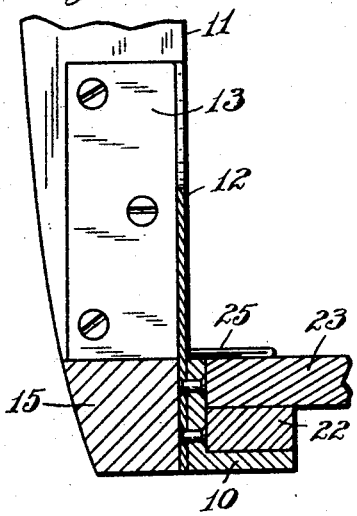
INVENTORS
Chester A. Frick and
Ralph W. Dwight,
BY
Arthur M. Hood.
ATTORNEY Patented Apr. 5, 1927.

1,623,946

UNITED STATES PATENT OFFICE.

CHESTER A. FRICK AND RALPH W. DWIGHT, OF MUNCIE, INDIANA, ASSIGNORS TO GLASCOCK BROTHERS MANUFACTURING COMPANY, OF MUNCIE, INDIANA, A CORPORATION OF INDIANA.

AUTOMOBILE BODY.

Application filed October 29, 1923. Serial No. 671,341.

The object of our invention is to provide certain improvements in details of construction of automobile bodies whereby such bodies, of various forms and types, may be fabricated in two or more standardized sections by the utilization of various standard parts, in conjunction with such special parts as may be necessary, so that these sections may be built up independently of each other and may be shipped either assembled or knocked down, as desired. Also, so that the bodies can be fabricated to compete with present common construction having heavy continuous wooden sills. A further object of our invention is to provide a construction in which the door openings may be readily maintained in proper door-receiving condition.

With such a construction, the whole body is stiffened up and trussed, thereby producing a very rigid structure. At the same time, the cost of painting and trimming may be considerably lowered due to the fact that there are smaller pieces to handle, and more bodies can be stored in a given space, thereby cutting down freight charges and storage charges, either at the body manufacturer's plant or at the plant of the automobile manufacturer. The bodies may be more cheaply installed on the chassis frame due to the smaller size of the units.

Figure 1:
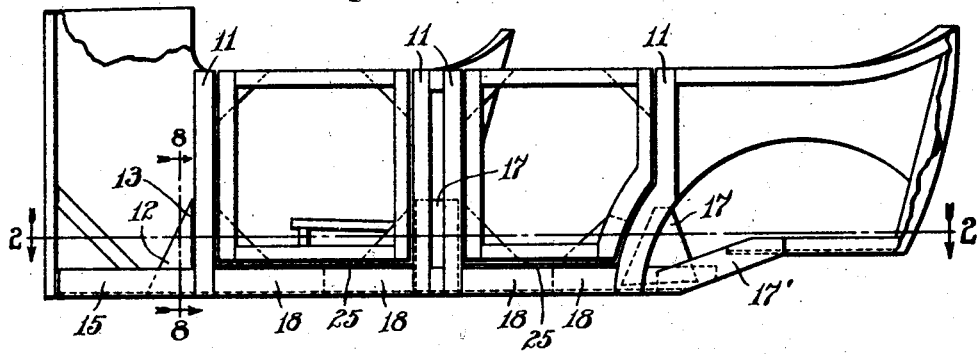

The accompanying drawings illustrate our invention. Fig. 1 is a side elevation of the body frame embodying our invention, Fig. 2 a section on line 2—2 of Fig. 1, Fig. 3 a section, on an enlarged scale, on line 3—3 of Fig. 2, Fig. 4 a fragmentary section on line 4—4 of Fig. 3, Fig. 5 a fragmentary section on line 5—5 of Fig. 3, Fig. 6 a fragmentary perspective of the lower front corner of the frame, Fig. 7 a fragmentary perspective of one of the forward corner braces and support for the inclined footboard, and Fig. 8 a section on line 8—8 of Fig. 1.

In the drawings, 10, 10, 10 indicate a series of abutting aligned sill angle irons arranged with one arm vertical and the other horizontal with their abutting ends at some intermediate point, perferably midway, between the side posts 11 of the door openings.

It is understood that if desired or necessary, any structural shape may be used in the place of the angle irons, which of course might change the shape and type of the gusset plates.

In the drawings, we have shown the body formed with two door openings in each side, but it will be readily understood that our invention is equally applicable to bodies having any desired number of door openings.

The forward post 11 is secured to the forward sill angle 10 by means of a triangular gusset plate 12 the main body of which is secured to the vertical arm of the sill angle, said gusset plate having an outwardly extending vertical flange 13 secured to the forward face of the post. A wooden sill 15 is secured to the outer face of the vertical arm of the adjacent angle iron sill by screws 16.

Similarly, the other posts 11 are secured to the adjacent angle iron sill sections by suitable gusset plates 17 and wooden sill sections 18—18 secured to the vertical arms of the angle iron sections and abutted against the posts 11.

In the form of the body shown in the drawings having a so called "kick up" at its rear end, the gusset plates 17' provide the desired "kick up", as a connection between adjacent sill irons 10.

Adjacent sill sections 10 are firmly secured together by bridge irons, preferably channels, 20 and bolts 21 passed through said irons and through the horizontal arms of the sill irons, the bridge irons conveniently having a length equal to the space between the two posts 11 of the door opening.

Suitable floor-supporting wooden fillers 22 are secured to the horizontal arms of the sill bars 10 on a level with the tops of the bridge irons 20 and floor boards 23 laid thereon. Opposite the door openings these floor boards are provided on their under faces with pockets 24 formed to receive and interlock over the heads of bolts 21, these floor boards being conveniently held in place by a metal scuff strip 25 laid across the door opening and held in place by screws 26 passing down into the adjacent wooden sills 18.

Figure 2:
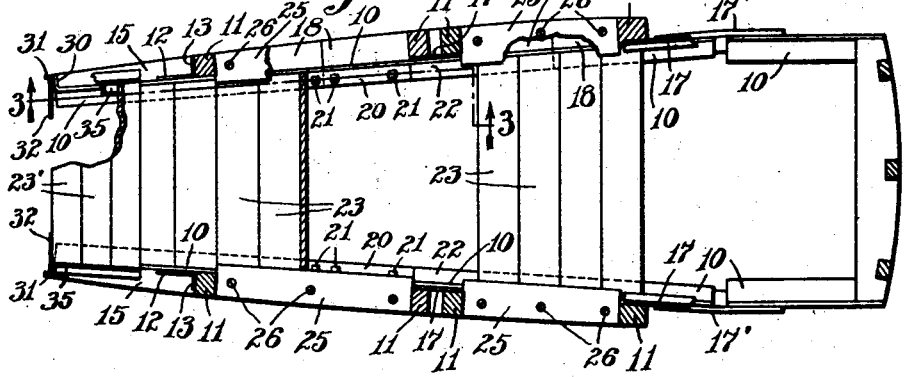
Figure 3:
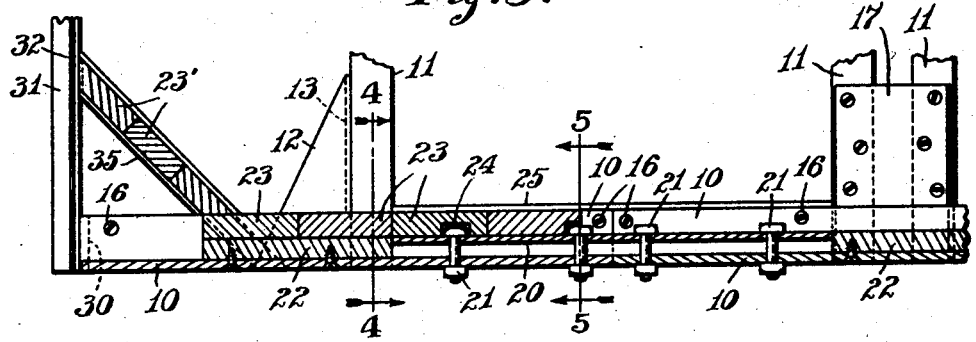

The forward ends of the forward sill irons 10 are bent outwardly as shown at 30 Fig. 2, and to these portions are secured the lower ends of the angle iron posts, or hood ledge 31, to which the dash board 32 is secured.

In order to brace posts 31 and form a support for the inclined footboards 23′ we provide an angle iron brace 35 the ends of which are bent as shown in Fig. 7 to form means by which this brace may be secured to the adjacent sill iron and post.

By the above construction we are able to produce a body in transverse sections abutting opposite the door openings, each of these sections carrying a door-opening post which is very firmly associated with the sill bar so that it will at all times remain in its original position. These sections may be packed together very closely in shipping and may then be assembled by the user, by means of the bridge irons 20, into a rigid structure in which the door posts will at all times occupy proper relations with each other so that the doors will at all times swing freely.

It will be understood, of course, that the body will be completed by the attachment, to the various body members, of such enclosing sheathing as may be desired.

The metal sill bars and bridge posts will be substantially the same for many different forms of bodies, such changes as may be necessary being made in the gusset plates and wood sills.

We claim as our invention:

1. An automobile body comprising two longitudinal series of sill irons, each extending part way across a door opening, door-opening posts carried by said sill irons, gusset plates secured to said sill irons and posts, bridge irons extending across a door opening, and means connecting each bridge iron with two adjacent sill irons.

2. An automobile body comprising two longitudinal series of sill irons, each extending part way across a door opening, door-opening posts carried by said sill irons, bridge irons extending across a door opening, and means connecting each bridge iron with two adjacent sill irons.

3. An automobile body comprising two longitudinal series of sill irons, each extending part way across a door opening, door-opening posts carried by said sill irons, gusset plates secured to said sill irons and posts, bridge irons extending across a door opening, means connecting each bridge iron with two adjacent sill irons, floor boards having an interlocking engagement with the bridge irons, outside wooden sill bars secured to the iron sill bars, and a scuff plate secured to said outside sill bars and overlying the floor boards to hold them in position.

4. An automobile body comprising two longitudinal series of sill irons, each extending part way across a door opening, door-opening posts carried by said sill irons, bridge irons extending across a door opening, means connecting each bridge iron with two adjacent sill irons, floor boards having an interlocking engagement with the bridge irons, outside wooden sill bars secured to the iron sill bars, and a scuff plate secured to said outside sill bars and overlying the floor boards to hold them in position.

5. An automobile body comprising a pair of aligned angle iron sill bars, a door post carried at an intermediate point by each of said sill bars, a bridge piece lying between the posts and secured to the sill bars, a gusset plate secured to the forward sill bar and to the forward post, a front corner post carried in the forward end of the forward sill bar, a brace bar arranged in the corner between said forward sill bar and the forward corner post and secured to said parts and forming a support for inclined floor boards.

6. An automobile body comprising a pair of aligned angle iron sill bars, a door post carried at an intermediate point by each of said sill bars, a bridge piece lying between the posts and secured to the sill bars, and a gusset plate secured to the forward sill bar and to the forward post.

In witness whereof, we have hereunto set our hands at Muncie, Indiana, this 13th day of October, A. D. one thousand nine hundred and twenty-three.

CHESTER A. FRICK.
RALPH W. DWIGHT.